Sept. 13, 1938.　　　　J. H. WEITER　　　　2,129,895
MEASURING DEVICE
Filed Feb. 13, 1936
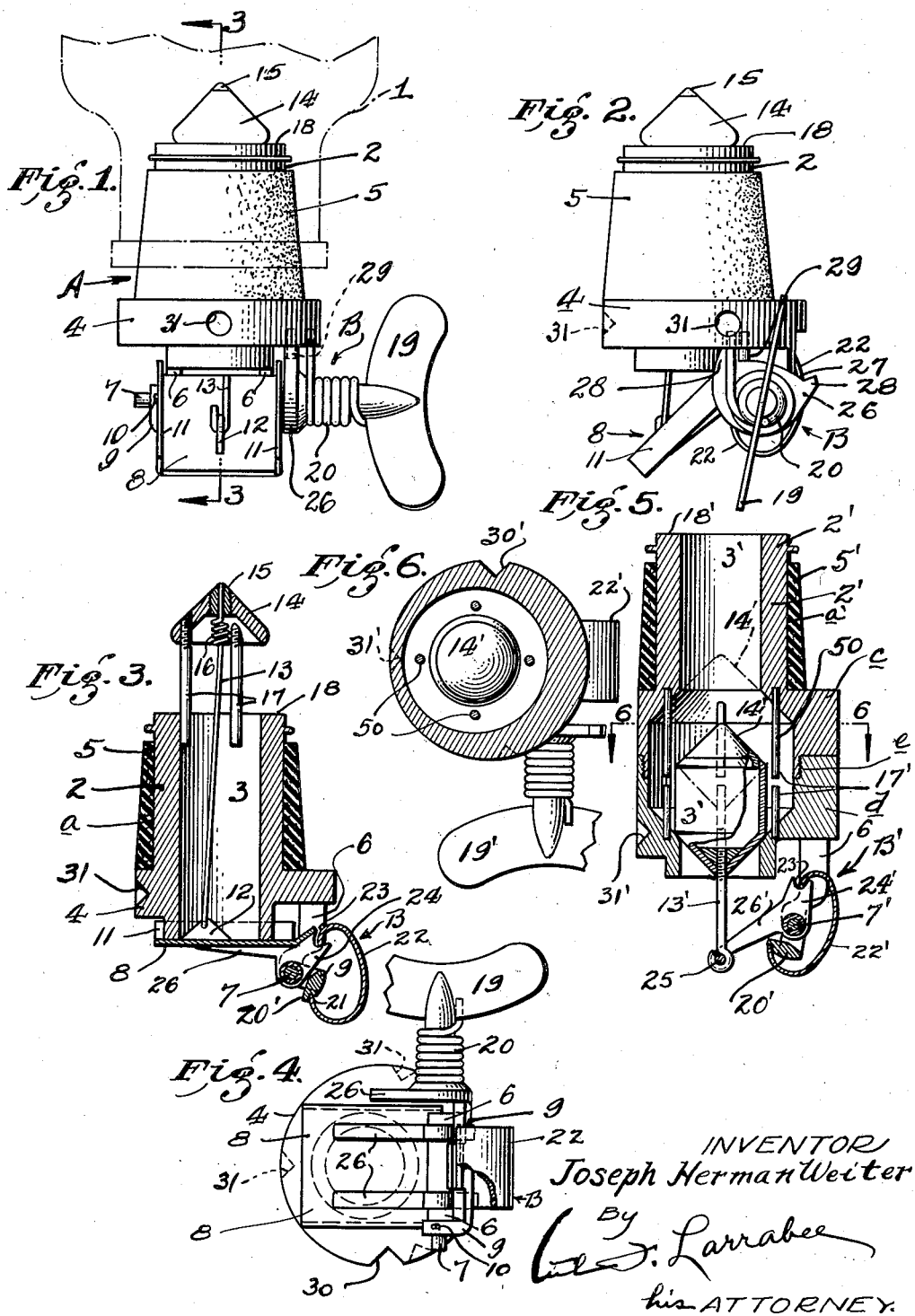

Patented Sept. 13, 1938

2,129,895

UNITED STATES PATENT OFFICE 2,129,895

MEASURING DEVICE

Joseph Herman Weiter, Los Angeles, Calif.

Application February 13, 1936, Serial No. 63,721

2 Claims. (Cl. 221—114)

This invention relates to measuring devices particularly to devices that may be associated with containers for delivering a measured quantity of the material contained in said container, as for instance a dose of head-ache remedy or other medicines or materials usually dispensed at drug stores and other places where a predetermined quantity of such material is desired to be dispensed for each dose, portion or drink.

An object of the invention is to provide a novel device that may be used as an attachment for bottles or containers and in which the material in the container is sealed therein and the measuring chamber when not in use is open to the atmosphere so as to prevent the material from becoming dampened in the measuring chamber, which will likely result in swelling of the material and resultant clogging of the device.

An object is to provide a novel device of the above character which will effectively seal the material in the container after a measured quantity thereof has been dispensed.

Another object is to provide a novel measuring device which after a measured quantity has been dispensed will automatically be maintained in a position in which the measuring chamber will be opened to the atmosphere.

A still further object of the invention is to provide a novel measuring device that may be manually operated to dispense a measured quantity of material to be dispensed and which will have a "snap" action in dispensing the material whereby the likelihood of granules of the material being dispensed remaining under the valve and preventing an effective seal will be reduced to a minimum, and which "snap" action will also prevent the valve and trap door remaining open for such period of time as may permit the material in the container to flow past the trap door in any amount other than the predetermined and measured quantity desired.

A still further object is to provide a novel attachment of the above character that is simple, economical of manufacture, easy to operate and which may be associated with frames and stands at present being used in conjunction with devices of analogous character.

Yet a further object is to provide a novel combined stopper for the opening of a container which will permit the contents thereof to be successively dispensed therefrom in measured quantities and which will prevent delivery or spilling of the contents of said container in the event the container should be accidentally tipped over.

The invention comprises the constructions, combinations and arrangements of parts, more particularly hereinafter set forth in the following specification and pointed out in the claims.

Other objects, advantages, and features of invention may appear from the accompanying drawing, the subjoined detail description and the appended claims.

The accompanying drawing illustrates the invention in some of the forms I at present deem preferable.

Figure 1 is a front elevation of a measuring device embodying my invention. Dot and dash lines indicate the mouth or opening of a container with which it is adapted to be associated. Parts of the container are broken away to contract the view.

Figure 2 is a side elevational view of my measuring device shown in Figure 1 and looking from the right toward the left in Figure 1.

Figure 3 is an axial sectional view taken on line 3—3, Figure 1, but showing the device in position to receive a charge from the container.

Figure 4 is a bottom plan view of the device shown in Figures 1–3 and with the parts in the same position as shown in Figure 3. Parts are broken away to contract the view.

Figure 5 is a modified form of my invention and in which the dispensing valve is operated in a reverse direction to that shown in Figures 1-4, and in this Figure 5 the valve is shown as being operated to permit the measuring chamber to be filled after which the valve automatically closes to the position shown in dot and dash lines.

Figure 6 is a transverse sectional view taken on line 6—6, Figure 5. Parts are broken away to contract the view.

Referring to Figures 1-4, 1 indicates the open end or mouth of a bottle or container with which my measuring and dispensing device A is associated and which comprises a housing 2 that is provided with an axial bore 3 which forms a measuring chamber of a predetermined capacity to receive a charge or dose from the container 1. The housing 2 is provided with an annular flange 4 that is adapted to be received in a supporting frame (not shown) and upstanding from the flange 4 is a neck portion $a$ that receives a gasket 5 of rubber or other suitable material to form an effective air tight seal with the mouth or opening of the container 1.

Extending from the underside of, and at the rear of the flange 4 is a plurality of bosses 6 that form bearings for a shaft 7 to which the trap door 8 is pivotally connected and to which a yoke 9 is fixed by any suitable means as by a pin 10.

The trap door 8 is provided with upstanding side flanges 11 that confine the ingredients into a predetermined path while the same are being dispensed. An upstanding lug 12 is also provided on the door 8 and to which a connecting link 13 is pivotally connected at one end and which link 13 is secured in any suitable manner at its other end to a valve 14 by any suitable means as by the plug 15 that is threaded into the valve 14. The link 13 is provided intermediate its ends with a coiled portion 16 that is preferably formed in the concave underside of the frusto conical valve 14 and which provides a resilient spring means that takes up the shock of the "snap" action of the valve operating mechanism B that will be more fully hereinafter described.

Guide pins or members 17 extend downwardly from the valve 14 and slidably engage the side walls of chamber 3 to guide the valve 14 away from and toward the valve seat 18 against which the valve 14 seats and makes an air tight fit therewith.

The valve operating mechanism B comprises the shaft 7 to which an operating or handle member 19 is fixed and a spring 20 has one end connected to the flange 4 and the other end thereof to the member 19 so that the shaft 7 and yoke 9 will be normally forced into one direction to normally maintain the trap door 8 in open position and the valve 14 in closed position. The yoke 9 is provided with a depending lug 20' that is provided with a recess 21 into which one end of a spring member 22 is received and the other end of said spring member 22 is received in a recess 23 that is formed in an upstanding lug 24 that is connected to the trap door 8.

In the modification shown in Figures 5 and 6 the analogous parts are given the same numbers with an "exponent" and therefore further description of the same parts will not be necessary. However, the valve 14' is connected to a U-arm 25 that is formed by the ribs 26 on door 8 and the connecting arm at the outer extremities thereof by the link 13' that is secured to one end of the valve 14' in any suitable manner as by threading the same thereinto, as shown, and the guide pins or posts 17' are extended from the opposite sides of the parts c and d that are threaded or otherwise secured together as at e to form the measuring chamber 3'.

In operation of the device shown in Figures 1–4 the valve 14 is normally in closed position as shown in Figures 1 and 2, and in order to dispense a measured quantity of the ingredients in the container 1 the handle member 19 is moved forwardly, as viewed in Figure 1, thereby oscillating the shaft 7 forwardly and the yoke 9 rearwardly, and as a result of such operation a tension will be built up in the spring 22, that the same will be exerted against the lug 24 and due to the "off-center" position of yoke 19 and lug 24 will cause the door 8 to be oscillated about shaft 7 to move the trap door 8 against the lower end of the housing 2 and effectively seal the same against contents of the container escaping past the door 8 and at the same time the valve 14 will be raised to permit flow of gravity of the contents of the container 1 into the measuring chamber 3. Upon release of the handle member 19 the spring 20 will automatically urge the shaft 7 in a reverse direction to move the yoke 9 in a reverse direction with respect to its pivotal connection with shaft 7 so that the tension created in spring 22 will be exerted upon lugs 24 to cause the door 8 to be opened and through the link 13 to move the valve 14 against its seat 18. The flexibility of link 13 and the spring 16 formed therein permits sufficient resiliency to enable the valve 14 and pins 17 secured thereto to operate in a satisfactory manner. The pins 17 are preferably 3 in number spaced equi-distant around the valve 14.

A collar 26 provided with a recess 27 that provides lugs 28 which cooperate with a pin 29 that is secured on shaft 7 to limit the movement of shaft 7 in either direction.

The flange 4 is provided with a notch 30 that receives a lug (not shown) on a stand (not shown) with which the measuring device may be associated, and the flange 4 is also provided with recesses 31 with which screws cooperate to maintain the device in proper position relative to a supporting stand that is commonly used for supporting and holding a device of this character.

In the operation of the device shown in Figures 5 and 6 when the handle member 19' is moved forward the valve 14' is moved downwardly as shown in Figure 5 and the measuring chamber 3' is filled with ingredients from the container 1 and upon release of the member 19' the valve 14' will automatically be moved to the dot and dash line position shown in Figure 5 to seal the contents of the container therein and release the contents previously filling the measuring chamber 3'.

In the device shown in Figures 5 and 6, I have provided a housing 2' that is split and threaded together as at e and in which pins 50, preferably four in number are equidistantly spaced around the chamber 3' to guide the valve 14' upwardly and downwardly to open and closed positions. The pins 50 are preferably secured into the walls forming the chamber 3' and are spaced from the side walls of valve 14' a sufficient distance that the valve 14' will be enabled to move upwardly and downwardly in the measuring chamber 3', regardless of the pivotal and fixed connections between the operating mechanism B' and the valve 14'.

I claim:

1. In a measuring device, a housing having an axial bore therethrough and means of connection with a container; a valve for engagement with one end of said housing to close the bore therein; a trap door pivotally connected to said housing to close the other end of said bore; means extending through said bore and connecting said trap door and said valve; and means to move said trap door to close one end of said bore and to move said valve away from said housing, said means including a handle member and means to move said valve and trap door with a snap action.

2. In a measuring device, a housing having means for connection with a container and a measuring chamber in said device; a valve normally sealing the contents of said container in said container; a trap door operatively associated with one end of said measuring chamber and being normally in open position; a link provided with a coiled portion intermediate its ends, said link connecting said trap door and said valve; a shaft on which said trap door is pivotally mounted; a handle member for oscillating said shaft; and spring means connecting said shaft and said trap door to move said trap door to closed position upon oscillation of said shaft, and to open said valve member.

JOSEPH HERMAN WEITER.